(12) United States Patent
Trainor et al.

(10) Patent No.: US 6,181,331 B1
(45) Date of Patent: *Jan. 30, 2001

(54) MAN-MACHINE INTERFACE

(75) Inventors: John J. Trainor, Wake Forest; Carl J. Laplace, Raleigh, both of NC (US); Michael A. Bellin, Brandon, MS (US); Mark R. Hoffmann, Chapel Hill, NC (US)

(73) Assignee: Siemens Power Transmission & Distribution, Inc., Wendell, NC (US)

(*) Notice: Under 35 U.S.C. 154(b), the term of this patent shall be extended for 0 days.

This patent is subject to a terminal disclaimer.

(21) Appl. No.: 09/025,001

(22) Filed: Feb. 17, 1998

Related U.S. Application Data

(63) Continuation of application No. 07/950,402, filed on Sep. 23, 1992.

(51) Int. Cl.[7] ............................................. G09G 5/00
(52) U.S. Cl. ............................................. 345/212; 345/211
(58) Field of Search ................................... 345/211, 212; 364/528.28, 528.33, 146, 188, 189

(56) References Cited

U.S. PATENT DOCUMENTS

| | | | |
|---|---|---|---|
| 3,906,482 | 9/1975 | Morrison | 340/782 |
| 4,361,730 | 11/1982 | Barber et al. | 179/5 R |
| 4,400,783 | * 8/1983 | Locke, Jr. et al. | 702/58 |
| 4,418,333 | 11/1983 | Schwarzbach et al. | 340/310 A |
| 4,419,619 | 12/1983 | Jindrick et al. | 323/257 |
| 4,433,387 | 2/1984 | Dyer et al. | 364/900 |
| 4,484,307 | 11/1984 | Quatse et al. | 364/900 |
| 4,503,291 | 3/1985 | von Holten et al. | 179/90 AN |
| 4,535,409 | * 8/1985 | Jindrick et al. | 364/528.28 |
| 4,612,617 | 9/1986 | LaPlace et al. | 364/483 |
| 4,628,158 | 12/1986 | Rubin | 379/10 |
| 4,630,220 | * 12/1986 | Peckinpaugh | 364/528.33 |
| 4,645,874 | 2/1987 | Fildes | 379/93 |
| 4,685,064 | 8/1987 | Kinoshita et al. | 364/189 X |
| 4,996,646 | 2/1991 | Farrington | 364/483 |
| 5,049,804 | 9/1991 | Hutchings | 320/20 |
| 5,065,321 | 11/1991 | Bezos et al. | 364/424.04 |
| 5,077,582 | 12/1991 | Kravette et al. | 355/206 |
| 5,105,370 | 4/1992 | Shaw et al. | 364/550 |
| 5,105,371 | 4/1992 | Shaw et al. | 364/550 |
| 5,107,446 | 4/1992 | Shaw et al. | 364/550 |
| 5,119,012 | 6/1992 | Okamura | 323/258 |
| 5,138,562 | 8/1992 | Shaw et al. | 364/550 |
| 5,263,134 | * 11/1993 | Paal et al. | 345/342 |
| 5,335,135 | * 8/1994 | Kinney | 361/79 |
| 5,844,550 | * 12/1998 | Trainor et al. | 345/212 |

FOREIGN PATENT DOCUMENTS 0294235   11/1988   (JP) ...................................... 323/318

* cited by examiner

Primary Examiner—William A. Cuchlinski, Jr.
Assistant Examiner—Marthe Y. Marc-Coleman

(57) ABSTRACT

A controller for a voltage regulator has an input keypad for designating selected operating parameters of the voltage regulator. The keypad is formed with a dedicated function portion and a menu navigation portion, and the parameters are divided into first and second categories. The controller has a display for displaying the parameters, and a computer is connected to the input and to the display for controlling the display in response to activation of the keypad. Any parameter in the first category can be displayed on the display by activation of the dedicated function portion of the keypad. Any parameter in the second category can be displayed by activation of the menu navigation portion. The menu navigation portion can optionally also be used to control display of parameters in the first category.

8 Claims, 6 Drawing Sheets

MAN-MACHINE INTERFACE

This is a continuation of application Ser. No. 07/950,402, filed Sep. 23, 1992.

BACKGROUND OF THE INVENTION

1. Field of the Invention

This invention relates to apparatus for controlling a voltage regulator and more particularly to a novel and highly effective "man-machine interface" that enables a user of the apparatus easily and efficiently to display and control selected parameters of the voltage regulator.

2. Description of the Prior Art

In conventional practice, the parameters of a voltage regulator are accessed by means of physical switch settings, both for viewing and for configuration. Some control systems employ numerical identification codes entered by a keypad for the purpose of viewing and modifying system parameters. These conventional mechanisms are limited in the number of physical parameters available for access because of physical space restrictions and often require a chart or index list that must be consulted by an operator in order to access the parameters.

Operation of a keyboard or other interfacing device for data input should be efficient, easy, and even to a degree intuitive. Though often criticized as less than perfect, the QWERTY layout of a conventional typewriter keyboard, for example, is preferred by most users to an alphabetical layout (ABC . . .) in part because the former places the "E" key and other relatively frequently used keys in positions that are more accessible than, for example, that of the "Q" key and other relatively infrequently used keys.

It has been found that interfaces developed heretofore for permitting access to various parameters of voltage regulators are very awkward to use.

Representative prior art relating to menus, user interfaces, and keypads is found in U.S. Pat. Nos. 361,730, 4,503,291, 4,628,158, 4,645,874 and 5,077,582. The apparatus and techniques disclosed in these patents are representative of the current state of the art in this field; they do not enable an operator of a voltage regulator control to gain access to system parameters for viewing and modification with great ease and efficiency.

OBJECTS AND SUMMARY OF THE INVENTION

An object of the invention is to remedy the deficiencies of the prior art noted above and in particular to provide apparatus for controlling a voltage regulator that improves the ease and efficiency with which an operator of a voltage regulator can gain access to voltage regulator parameters for viewing and modification.

Another object of the invention is to provide apparatus for controlling a voltage regulator that enables an operator in effect to "scan" and, if necessary, adjust the operating parameters of a voltage regulator in rapid succession.

Another object of the invention is to provide apparatus for controlling a voltage regulator the operation of which requires no special training.

Another object of the invention is to provide apparatus for controlling a voltage regulator that enables a more rapid response to an alert condition or another condition requiring attention.

The foregoing and other objects are attained in accordance with the invention by the provision of apparatus for controlling a voltage regulator, the apparatus comprising: input means for designating selected operating parameters of a voltage regulator, the input means being formed with a dedicated function portion and a menu navigation portion and the parameters being divided into first and second categories; display means for displaying the parameters; and computer -means connected to the input means and the display means for controlling the display means in response to activation of the input means; the apparatus being constructed so that any parameter in the first category can be displayed on the display means by activation of the dedicated function portion and any parameter in the second category can be displayed on the display means by activation of the menu navigation portion.

Preferably, any parameter in the first category can also be displayed on the display means by activation of the menu navigation portion.

In the best mode for practicing the invention known to the inventors, the input means comprises a keypad, the dedicated function portion comprises a plurality of keys physically grouped together in a first area of the keypad, and the menu navigation portion comprises a plurality of keys physically grouped together in a second area of the keypad.

In accordance with an independent aspect of the invention, there is provided a method for controlling a voltage regulator, the method comprising the steps of: providing input means for designating selected operating parameters of a voltage regulator, the input means being formed with a dedicated function portion and a menu navigation portion and the parameters being divided into first and second categories; providing display means for displaying the parameters; activating the dedicated function portion to display parameters in the first category; and activating the menu navigation portion to display parameters in the first or second category.

BRIEF DESCRIPTION OF THE DRAWINGS

A better understanding of the objects, features and advantages of the invention can be gained from a consideration of the following detailed description of the preferred embodiment thereof, in conjunction with the appended figures of the drawing, wherein a given reference character always refers to the same element or part, and wherein.

DESCRIPTION OF THE PREFERRED EMBODIMENT

Figure 1:
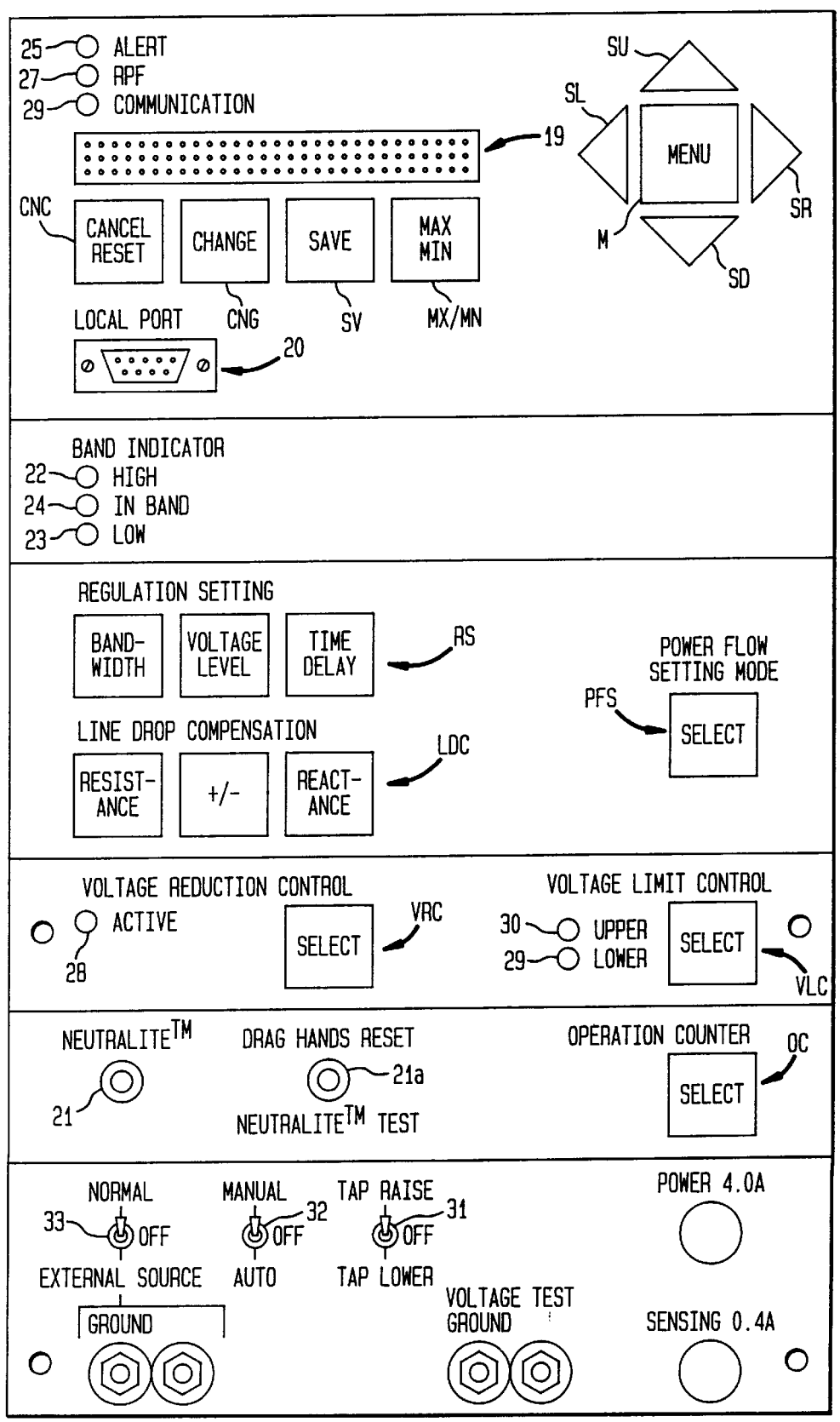
FIG. 1 is a view of a keypad and display interface and can be thought of as a plan view (if the keypad and display are oriented in a horizontal plane) or as an elevational view (if, as will be the usual case, they are mounted on a panel in a vertical plane), the keypad being a part of input means for designating selected operating parameters of a voltage regulator and the display being a part of means for displaying the parameters.

Operational parameters, setpoints and special functions including metering parameters and local operator interfacing are accessed in accordance with the invention via any suitable switching device such as membrane contact switches. The layout of the membrane keypad can be varied but has characteristics illustrated in FIG. 1.

The keypad is designed to provide direct (i.e., single keystroke) access to regularly used functions, plus quick access (via a menu arrangement) to all of the remaining functions.

The buttons towards the bottom of the keypad (including Regulation Setting RS, Line Drop Compensation LDC, Power Flow Setting Mode PFS, Voltage Reduction Control VRC, Voltage Limit Control VLC, and Operation Counter OC) are dedicated function keys. They permit single-key access to the most commonly used functions. The buttons at the top of the display (including Cancel CNC, Save SV, Change CNG, Max/Min MX/MN, Menu M, and the Scroll or arrow keys SU, SD, SL, SR surrounding the Menu key) are configuration/select or menu navigation keys. They permit access (through menu screens) to all of the control features, including those that can be accessed by a single keystroke of one of the dedicated function keys.

Configuration/Select Keys

The configuration/select or menu navigation keys include the scroll keys (arrows), Menu, Cancel, Save, Change, and Max/Min. These keys are physically grouped together, for example in an upper part of the keypad.

The ↑ (scroll up or SU) and ↓ (scroll down or SD) arrow keys respectively above and below the Menu key permit the user to move upward and downward, respectively, through the menu headings. The → (scroll right) and ← (scroll left) arrow keys respectively to the right and left of the Menu key permit the user to move forward and backward, respectively, through the items under the menu headings. The Menu key allows the user to quickly return to the menu heading level. Pressing Menu twice turns the user to the top of the menu headings list.

By means of this interface, an operator can view and/or change the unit's configuration. When a window with a configuration parameter is displayed, a cursor appears at the parameter. To change the parameter value, the user presses the Change key.

For numeric parameters, a cursor appears at the least significant digit or, in the preferred embodiment of the invention, the least significant digit flashes. The → and ← keys are used to position the cursor on the digit to be changed. The ↑ and ↓ keys are used to change the numeric value. Once the desired value is displayed, the user presses the Save key to save the revised value.

For alphabetic parameters, pressing the ↑ and ↓ keys show the different choices for that parameter. Once the desired value is displayed, the user presses the save key to save the revised value.

To get out of the "Change" Mode without saving, the user presses the Cancel key.

If either Save or Cancel is pressed to exit the "Change" Mode, the display continues to show the screen that was previously being edited.

To view the minimum and maximum stored values for a meter parameter, the user first displays the instantaneous value for the meter parameter. Pressing Max/Min once shows the maximum value for the parameter. Pressing Max/Min again shows the minimum value for that parameter. (The Max/Min key press activates a temporary display of the maximum or minimum value. If the Max/Min key is pressed once, the controller returns to displaying the instantaneous value after about 5 seconds. If the Max/Min key is pressed twice, the minimum value is displayed. If no more keys are pressed, the display reverts (after about 5 seconds) to the instantaneous meter value. If the Max/Min key is pressed while the minimum value is displayed, the maximum value is displayed again.)

If Cancel is pressed while the minimum or maximum value of a meter parameter is displayed, it causes these values to change to the value shown for the instantaneous meter parameter.

If either the → or ← the key is pressed while a minimum or maximum value is being displayed, the next or previous item screen will be displayed, respectively.

The operating rules for the configuration/select keys are summarized in Table 1 below: "Rules for Configuration/Select Keys". In the table, "Menu Level" refers to the heading level, e.g., Configure, Regulator, Meter, FW Demand, etc. . . . "Item" refers to any screen below the menu level; e.g., [Type: straight], [Syst: Wye], etc.}

TABLE 1

RULES FOR CONFIGURATION/SELECT KEYS

| Key | Menu Level | Display: Normal | Display: "Change" |
| --- | --- | --- | --- |
| Cancel | Displays Help message. | When "min" (or "max") value is being displayed, resets "min" (or "max") to present value. When viewing KQHR, KWHR, and Elapsed Ops screens, clears value to zero. | Returns to value shown before Change Mode was entered. Exits Change Mode. |
| Save | No effect | No effect | Stores the new value(s). Exits Change Mode. |
| Change | Displays Help message. | Enters "Change Mode", indicated by a change in the cursor type. | No effect. |
| Max/Min | No effect | If a meter value is being displayed, shows maximum reading for that parameter. If maximum reading being displayed, shows minimum value for the paramter. Times out after 5 seconds, display reverts to the instantaneous meter screen. | No effect. |
| Menu | Shows message: "Start of Menus" for ~2 seconds, then shows 1st menu screen. | Returns window to "Menu" level. Displays menu screen for the item that was active. | No effect. |

TABLE 1-continued

RULES FOR CONFIGURATION/SELECT KEYS

| Key | Menu Level | Display: Normal | Display: "Change" |
|---|---|---|---|
| ↑ | Shows previous menu. At 1st menu, shows "Menus Start/End" for ~2 seconds seconds then shows last menu screen. | No effect. | Changes value of parameter/digit downward |
| ↓ | Shows next menu. At last menu, shows "Menus Start/End" for ~2 seconds then shows 1st menu screen. | No effect. | Changes value of parameter/digit downward |
| ← | Displays last item screen for that menu. | Shows previous item screen. If present screen is 1st item screen, shows the menu screen for that item. | Moves "Change cursor" from right to left. |
| → | Displays 1st item screen for that menu. | Shows next item screen. If present screen is last item screen, shows the menu screen for that item. | Moves "Change cursor" from left to right. |

Setpoint keys

The Setpoint Keys or designated function keys permit single key access to several of the display screens. Each of these screens can be viewed with a single keystroke, but they require the "Change Mode" (i.e., an Edit Mode) to be enabled before the contents can be changed.

Pressing any of the Setpoint Keys has no effect if the display is currently in the Change Mode.

The operating rules for the Setpoint keys are listed in Table 2 below: "Rules for Setpoint Keys".

Special Function Keys

The Special Function keys permit single key access to several of the display screens. Each of these screens can be viewed with a single keystroke, but they require the "Change Mode" to be enabled before the contents can be changed.

Pressing any of the Special Function keys has no effect if the display is currently in the Change Mode.

The operating rules for the Special Function keys are listed in Table 3 below: "Rules for Special Function Keys".

TABLE 2

RULES FOR SETPOINT KEYS

| BUTTON | DESCRIPTION |
|---|---|
| Regulation Setting: | |
| Bandwidth | Directly accesses (forward) Bandwidth setting screen for regulator control. Pressing while FW screen is displayed causes RV screen to be shown and vice-versa. |
| Voltage Level | Directly accesses (forward) Voltage Level setting screen for regulator control. Pressing while FW screen is displayed causes RV screen to be shown and vice-versa. |
| Time Delay | Directly accesses (forward) Time Delay setting screen for regulator control Pressing while FW screen is displayed causes RV screen to be shown and vice-versa. |
| Line Drop Compensation: | |
| Resistance | Directly accesses (forward) Line Drop Compensation Resistance setting screen for regulator control. Pressing while FW screen is displayed causes RV screen to be shown and vice-versa. |
| +/− | If Line Drop Compensation Resistance or Reactance screen is presently being displayed and the "Change mode" is enabled, this button toggles between positive and negative compensation. Otherwise, it has no effect. |
| Reactance | Directly access (froward) Line Drop Compensation Reactance setting screen for regulator control. Pressing while FW screen is displayed causes RV screen to be shown and vice-versa. |

TABLE 3

RULES For SPECIAL KEYS

| BUTTON | DESCRIPTION |
| --- | --- |
| Power Flow Setting Mode: Select | Directly access Power Flow Setting screen for regulator control. |
| Voltage Reduction Control: Select | Directly accesses Voltage Reduction Control "mode select" screen. If pressed while VRC setting screen is active, will toggle to next VRC setting screen, eventually wrapping around to the "VRC mode select" screen. |
| Voltage Limit Control: Select | Directly accesses Voltage Limit Control-Upper Voltage setting screen. If pressed while upper voltage setting screen is displayed, will toggle to lower voltage setting screen. If pressed while lower voltage setting screen is displayed, will toggle to VLC State screen. If pressed while VLC State screen is displayed, will toggle to VLC upper voltage setting screen. |
| Operation Counter: Select | Directly accesses <MENU:COUNTER>[Total Ops = NN..N] display screen. If pressed while any <MENU:COUNTER> display screen is shown, will toggle to next <MENU:COUNTER> display screen. If this key is pressed while Automatic/Manual toggle switch is in Manual position, the [Tap:NN..N] screen is displayed. Subsequent presses will toggle through the <MENU:COUNTER> display screens in the order indicated in Table 3, eventually wrapping to the 1st counter screen. |

Indicators

The user interface supports two methods of displaying status information—via an alphanumeric display module 19, and via individual status indicators. The individual status indicators provide a direct means of assessing the regulator operating conditions.

A lamp 21 is illuminated to show that the tap changer is in the neutral position.

High, Low, and In-Band indicators 22, 23, 24 respectively show the status of the instantaneous sensed voltage relative to the voltage level and bandwidth setpoints. The "sensed voltage" includes the effect of line drop compensation, if active.

An ALERT indicator 25 is turned on in response to an active ALERT status. The ALERT indicator 25 remains on as long as any ALERT conditions remain in effect.

A communication indicator 26 activates whenever data transfer is in process across one or more of the controller's communications ports. Optionally, the communications indicator can be activated and left on if any configuration is performed remotely.

An RPF indicator 27 activates when the reverse current magnitude exceeds a predetermined threshold.

A Voltage Reduction Control (VRC) indicator 28 activates whenever the controller activates Voltage Reduction. A unique and distinct pattern of flashing can optionally be generated for each level of voltage reduction.

Voltage Limit Control (VLC) indicators activate when the regulator controller activates VLC. With the lower limit activated, the VIC Lower Indicator 29 is active. With the upper limit activated, the VLC Upper Indicator 30 is active.

Switches

A momentary switch 21 and several toggle switches 31, 32, 33 are provided for direct manual control. The momentary switch 21a when pushed down tests the lamp 21. When pushed up, it resets the drag hands maximum and minimum tap position indicators on the electromechanical tap position indicator. The toggle switch 33 is a power switch and has a Normal position and an External Source position. The switch 32 has a Manual position enabling manual control and an Auto position enabling automatic control of tap changer position. The switch 31 is effective only when the switch 32 is in the Manual position and in the case can be used to raise or lower the tap changer. All three switches 31–33 (and, of course, the momentary switch 21a) have Off positions.

Local Configuration Communication Port

Any suitable local port 20 such as an RS232-compatible port is preferably provided for serial communication with other apparatus, for example a palmtop or other computer. The physical interface can be a 9-pin D-type connector whose pin-out meets any suitable industry standard, for example, matching the PC-AT RS232 port connector. The supported signals should ideally meet the electrical requirements of the most recent RS232 specifications, and the System port ideally supports data transmission and reception at standard data rates (from 300 to 19.2 kbaud, inclusive).

The system protocol can be an adaption of an existing standard communications protocol. The SEAbus protocol is one possible standard that may be adapted to implement the system port protocol.

The system is provided to support connection to a hand held communications device. The port supports transfer of data in both directions—allowing the controller to be configured via the serial link, and also providing meter and status information to a connected device.

In addition to supporting the configuration and data retrieval functions required for remote access, the system port should support uploading and/or downloading the program code for the main processor.

Figure 2:
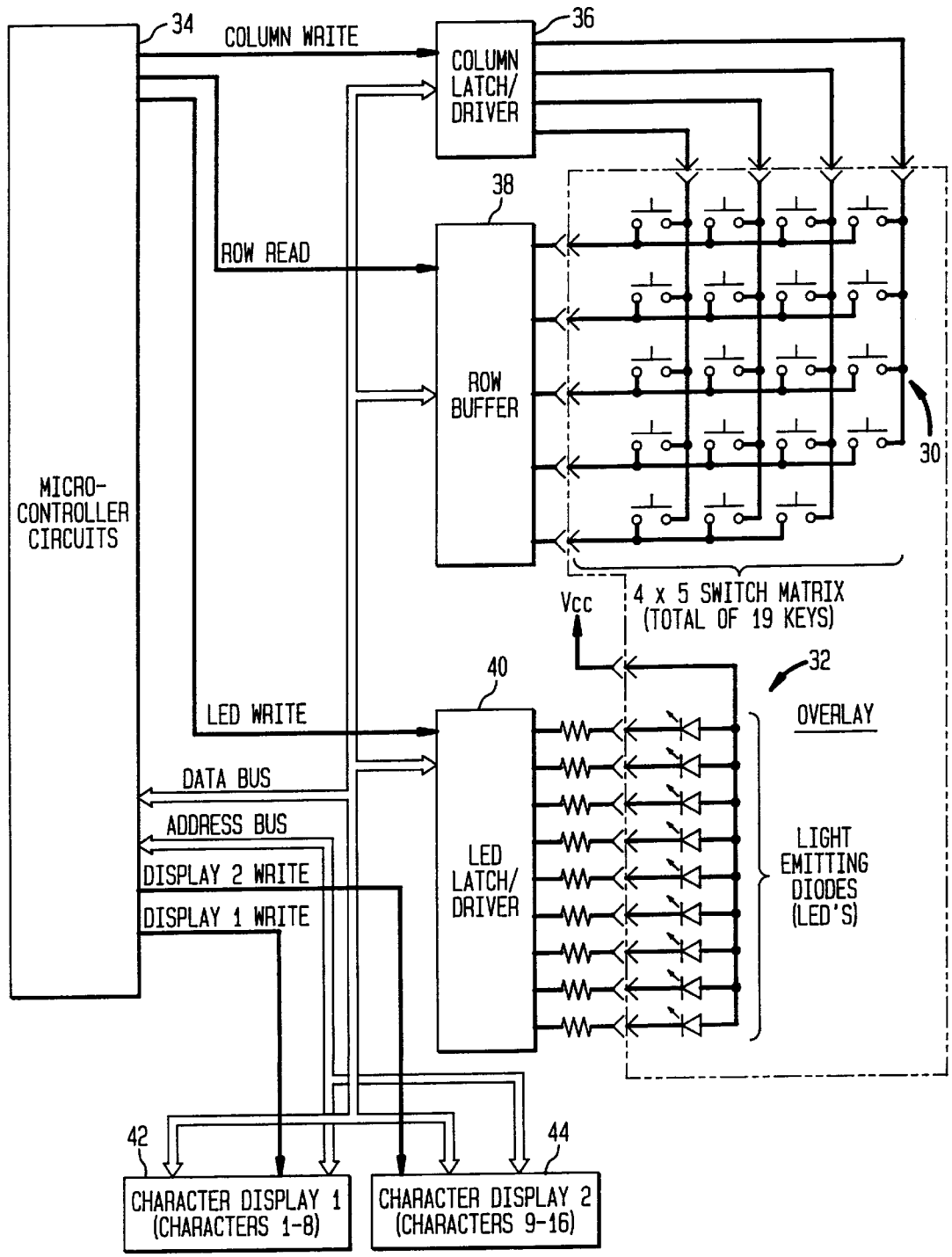
FIG. 2 is a schematic diagram showing the connection of the interface of FIG. 1 to a microcomputer.

FIG. 2 is a block diagram of interface circuits used in accordance with the invention. Corresponding to the nineteen keys shown in FIG. 1, there are nineteen switches arranged in a 4×5 switching matrix 30. The nine discrete light emitting diodes of FIG. 1 are shown collectively at 32 in FIG. 2.

Each of the switches 30 is normally open and is closed when an operator or user of the apparatus presses it.

A computer 34, which may be a Motorola MC68HC16Z1, writes the columns of the matrix through a column latch/driver and while each column is active polls the rows through a row buffer 38. The column latch/driver can comprise for example a Motorola 74HC374 latch and an open drain 74HC05; the row buffer can comprise a schmitt trigger and output inverter, for example, Motorola 74HC14 and 74HC244. These are conventional components conventionally arranged and enable the microcomputer 34 to determine when any of the keys 30 is pressed.

The computer controls an LED latch/driver which can be formed of a Motorola 74HC374 and ULW2003A high current driver. The light emitting diodes 32 are turned on in accordance with instructions from the microcomputer 34.

A first LED character display 42 for characters 1–8 is provided together with a second LED character display 44 for characters 9–16. A data bus connects the microcomputer 34 to the column latch/driver 36 the row buffer 38, the LED latch/driver 40, the character display and the character displays 42 and 44; an address bus connects the microcomputer 34 to the character displays 42 and 44 for controlling the addresses of the displayed characters.

The structure of FIG. 2 is one example of components that can be employed in implementing apparatus in accordance with the invention for controlling a voltage regulator.

Figure 3A:
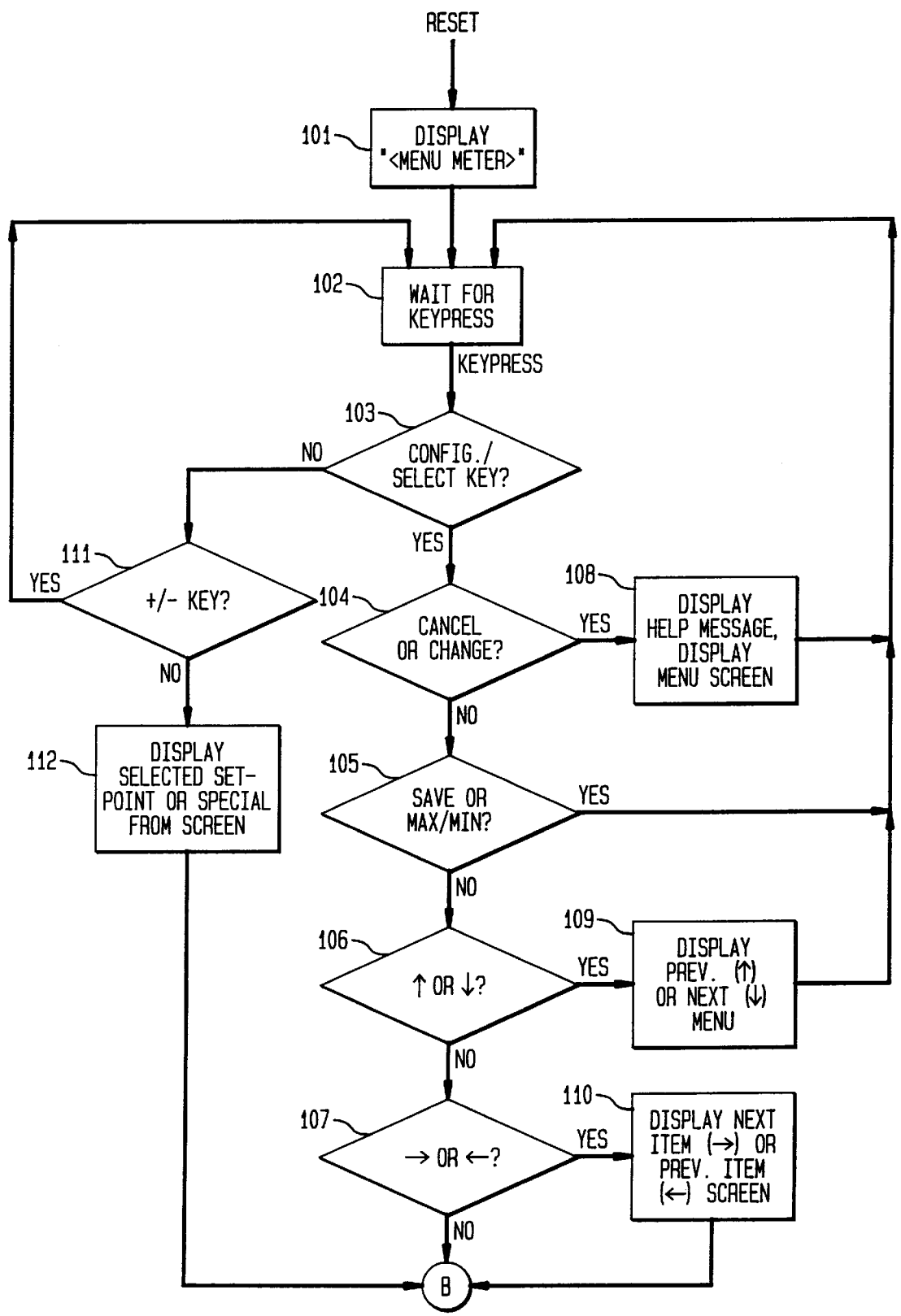
FIGS. 3A, 3B, 3C and 3D constitute a flowchart helpful in understanding the operation of apparatus constructed in accordance with the invention.

FIGS. 3A, 3B, 3C and 3D form a flowchart helpful in understanding the operation of apparatus constructed in accordance with the invention. FIG. 3A discloses the menu mode, FIGS. 3B and 3C the normal mode, and FIG. 3D the change mode.

In response to a reset, the program at step 101 displays <MENU: METER> and waits for a key press at step 102. When at step 102 a key press is detected as described above in connection with FIG. 2, the program investigates at step 103 whether a Config/Select key has been pressed. If so, a determination is made at step 104 whether a cancel or change key has been pressed. If so, since there is nothing to be canceled or changed, the program advances to step 108, where a help message is displayed, and then the menu screen is displayed and the program recycles to step 102 to wait for another key press.

If at step 104 it is determined that a cancel or change key has not been pressed, then at step 105 a determination is made whether a save or max/min key has been pressed. If so, since there is nothing to be saved and the max/min key is also inoperative under this condition, the program loops back to step 102 to wait for another key press.

If at step 105 it is determined that neither a save nor a max/min key has been pressed, a determination is made at step 106 whether the ↑ or ↓ key has been pressed. If so, then at step 109, in response to pressing the ↑ key, the previous menu is displayed; and, in response to pressing the ↓ key, the next menu is displayed. After performing the operation at step 109, the program loops back to step 102 to wait for another key press.

If at step 106 it is determined that neither the ↑ key nor the ↓ key is pressed, a determination is made at step 107 whether the → key or the ← key has been pressed. If so, then at step 110 the next item screen is displayed in response to pressing the → key or the previous item screen in displayed in response to pressing the ← key.

If at step 103 it is determined that a config/select key has not been pressed, then at step 111 it is determined whether the +/- key has been pressed. If so, since this key is inoperative under such a condition, the program loops back to step 102 to wait for another key press. If at step 111 it is determined that the +/- key has not been pressed, then at step 112 the selected step setpoint or special function screen is displayed.

Following the display effected at step 110 or 112 or following a determination at step 107 that neither the → key nor the ← key has been pressed, the program advances to step 201 (FIG. 3B), where it waits for another key press. When a key press is detected, the program advances to step 203, where a determination is made whether the cancel/reset key has been pressed. If so, at step 204 the program determines whether a max or min screen is displayed.

If so, at step 205 the stored maximum or minimum value is reset to the present value, and the program loops back to step 201.

If at step 204 it is determined that a max or min screen is not displayed, then at step 206 it is determined whether KQHR, KWHR, or elapsed Ops (see glossary below) is displayed. If so, then at step 207 the value is cleared, and the program loops back to step 201. If at step 206 it is determined that none of the investigated parameters is displayed, the program loops back to step 201 without clearing any value.

If at step 203 it is determined that the cancel/reset button has not been pressed, then at step 208 it is determined whether the → key or the ← key has been pressed. If so, since this key is inactive at this point, the program loops back to step 201 to wait for another key press.

If at step 208 it is determined that neither the → key nor the ← key has been pressed, then at step 209 the program determines whether the save key has been pressed. If so, since there is nothing to be saved, the program loops back to step 201 and waits for another key press.

If at step 209 it is determined that the save key has not been pressed, then at step 210 it is determined whether the max/min key has been pressed. If so, then at step 211 it is determined whether a meter or max screen is displayed. If so, then at step 212, the max screen is displayed if meter has been displayed, or the min screen is displayed if the max screen has been displayed, a timer is started, and the program loops back to stop 201. (When the program returns to step 201 from step 212, where the timer is set, the program looks both for the next key press and for a timer timeout. If a key press does not occur within a prescribed time, the timer times out, and the program advances to step 202 so that the meter value screen is displayed. The program then cycles back to step 201 to wait for the next key press.

If at step 211 it is determined that neither meter nor max screen is displayed, then at step 213 it is determined whether min screen is displayed. If so, then at step 214 the meter screen is displayed, the timer is cleared, and the program loops back to step 201.

If at step 213 it is determined that the min screen is not displayed, the program loops back to step 201 without taking any further action.

If at step 210 it is determined that the max/min button has not been pushed, then at step 215 it is determined whether the → key or the ← key has been pressed. If so, then at step 216, the previous screen is displayed if the ← key has been pressed or the next screen is displayed if the → key has been pressed.

Figure 3B:
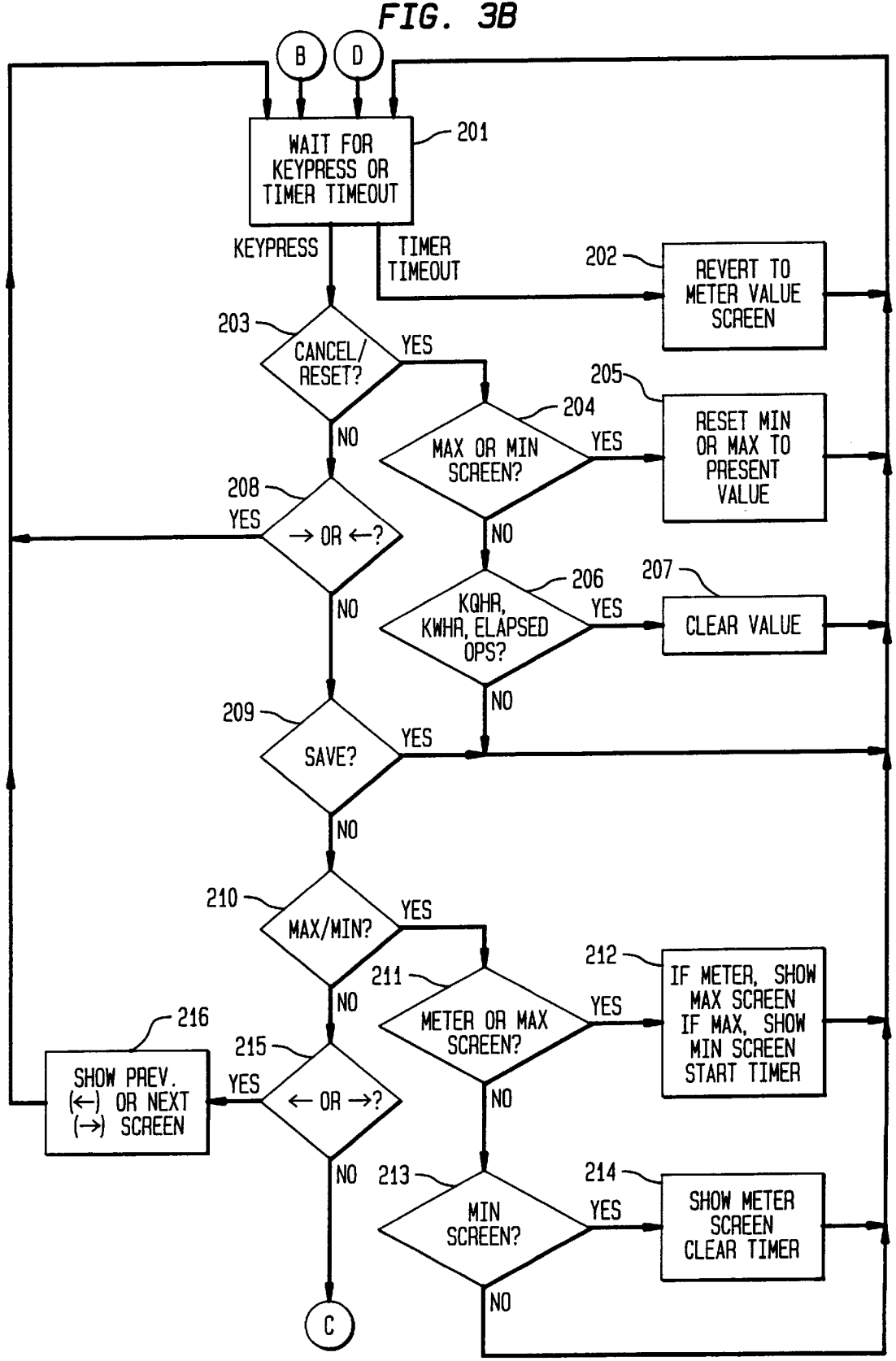
Figure 3C:
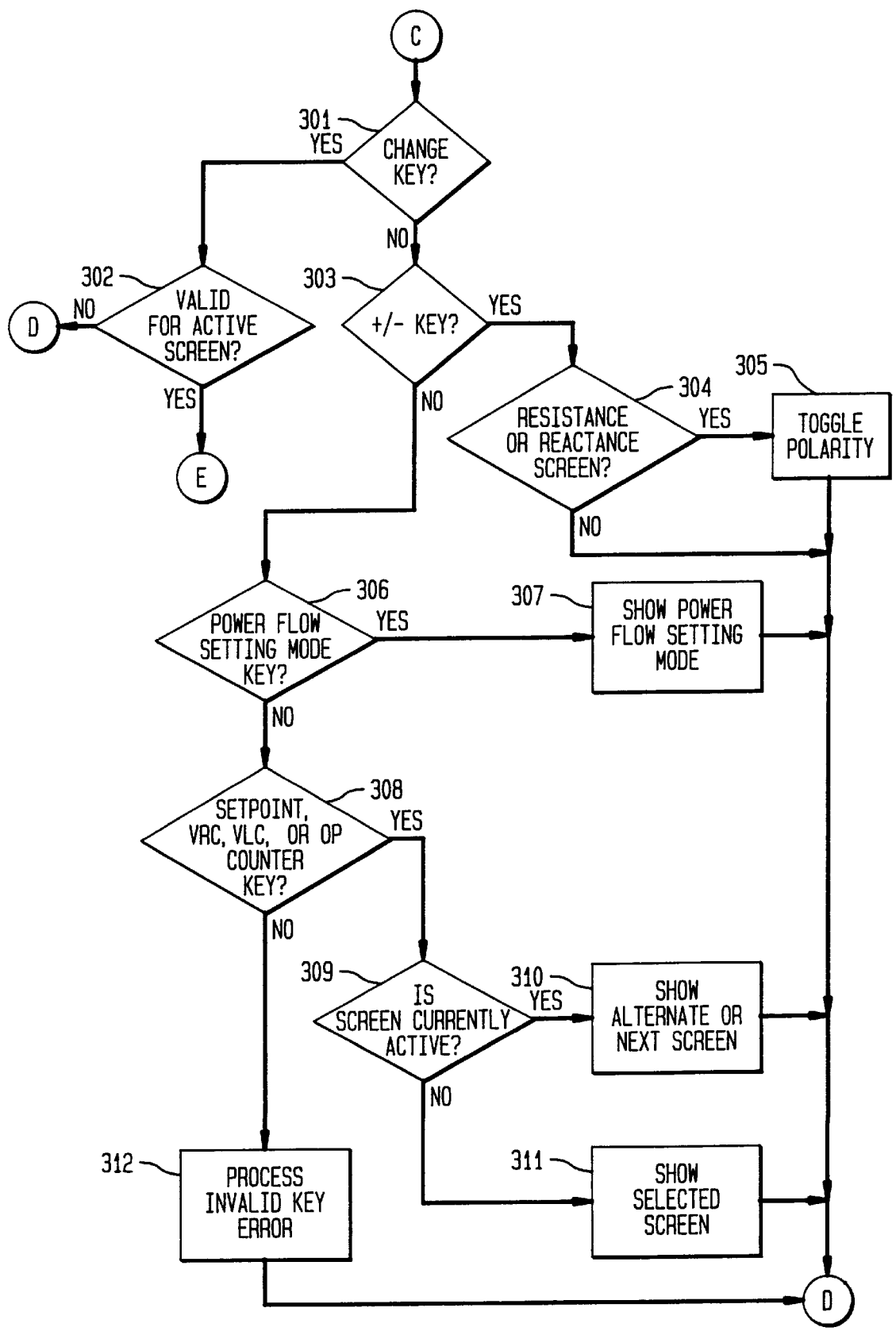
Figure 3D:
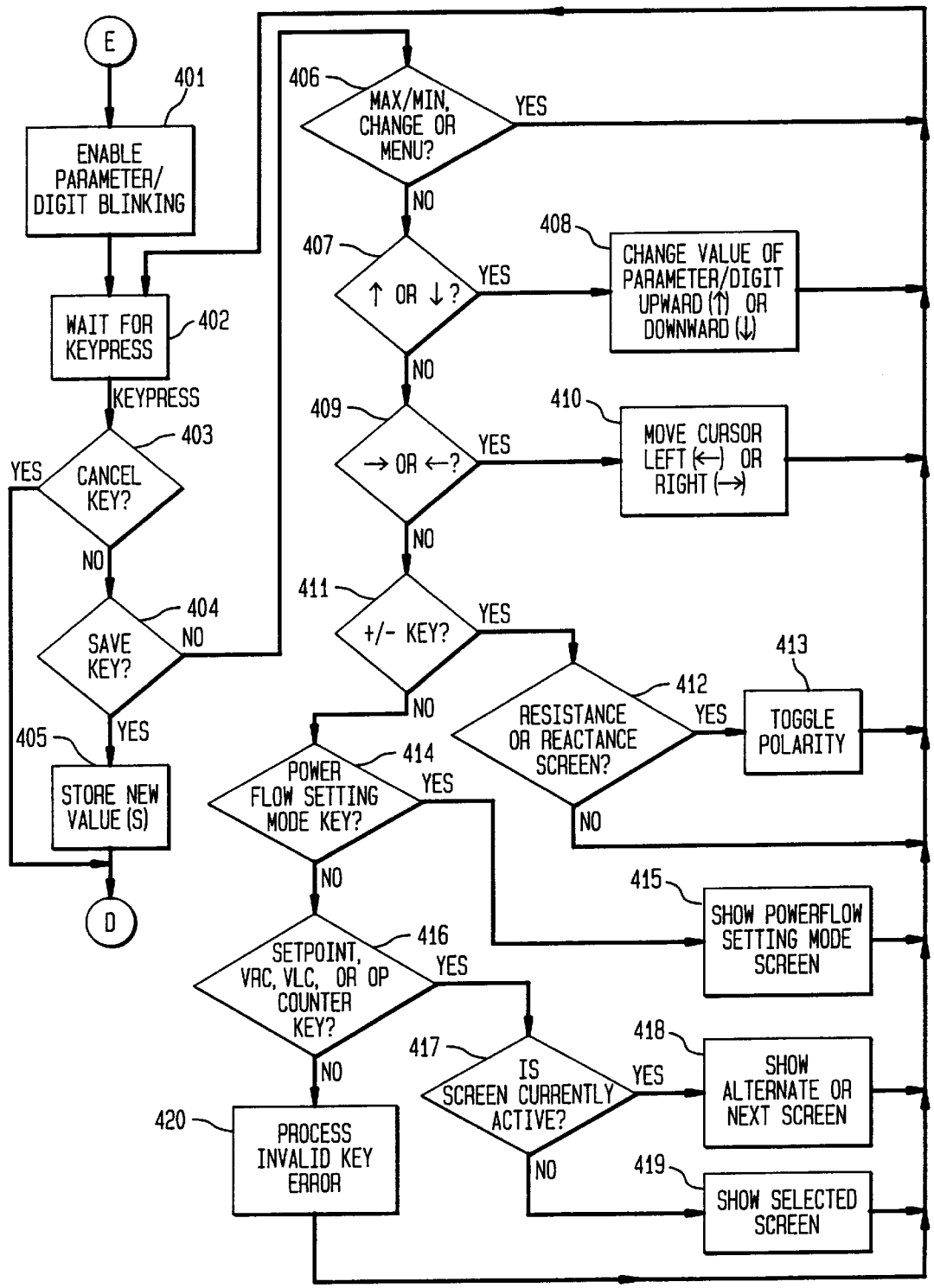

If at step 215 it is determined that neither the ← key or the → key has been pressed, then the program advances to step 301 shown in FIG. 3C. At step 301, it is determined whether a change key has been pressed. If so, then at step 302 it is determined whether the change key is valid for the active screen. If not, the program loops back to step 201 in FIG. 3B and waits for another key press.

If at step 301 it is determined that the change key has not been pressed, then at step 303 it is determined whether the +/- key has been pressed. If so, then at step 304 it is determined whether the resistance or reactance screen is displayed. If so, then at step 305 the polarity is toggled: that is, a + is changed to a - and a - to a +, and the program then loops back to step 201 in FIG. 3B.

If at step 304 it is determined that neither the resistance nor reactance screen is displayed, the program loops back to step 201 without taking any further action.

If at step 303 it is determined that the +/- key has not been pressed, then at step 306 it is determined whether the power flow setting mode key has been pressed. If so, the power flow setting mode is displayed, and the program loops back to step 201 in FIG. 3B.

If at step 306 it is determined that the power flow setting mode key has not been pressed, at step 308 it is determined whether the set point VRC, VLC or Ops counter key (see glossary below) has been pressed. If so, it is determined at step 309 whether the screen relating to the pressed key is currently active. If so, an alternate or next screen is displayed at step 310, and the program loops back to step 201 in FIG. 2B.

If at step 309 it is determined that the screen is not currently active, then at step 311 the selected screen is displayed, and the program loops back to step 201 in FIG. 3B.

If at step 308 it is determined that neither a set point, VRC, VLC nor Ops counter key has been pressed, then an invalid key or error routine is performed at step 312, and the program loops back to step 201 to wait for the next key press.

If at step 302 the change key investigated is determined to be valid for the activated screen, then the program advances to step 401 in FIG. 3C, where parameter/digit blinking is enabled. At step 402, the program waits for the next key press. Upon the occurrence of the next key press, a determination is made at step 403 whether the cancel key has been pressed. If so, the program loops back to step 201 in FIG. 3B and waits for the next key press. If a determination is made at step 403 that the cancel key has not been pressed, then at step 404 a determination is made whether the save key has been pressed. If so, then at step 405 the new values are stored, and the program loops back to step 201 of FIG. 3B to wait for the next key press.

If at step 404 it is determined that the save key has not been pressed, then at step 406 it is determined whether max/min, change or menu has been pressed. If so, the program loops back to step 402 to wait for the next key press.

If at step 406 it is determined that none of max/min, change and menu has been pressed, then at step 407 a determination is made whether the ↑ key or the ↓ key has been pressed. If so, then at step 408 the value of the parameter or digit is moved upward in response to pressing the ↑ key or downward in response to pressing the ↓ key.

If at step 407 it is determined that neither the ↑ key nor the ↓ key has been pressed, then at step 409 it is determined whether the ← key or the → key has been pressed. If so, then at step 410 the cursor is moved left or right, left in the case of the ← key being pressed, and right in the case of the → key being pressed, and the program loops back to step 402 to wait for the next key press.

If at step 409 it is determined that neither the ← key nor the → key has been pressed, then at step 411 it is determined whether the +/– has been pressed. If so, then at step 412 it is determined whether a resistance or a reactance screen is active. If so, then at step 413 the displayed polarity is reversed.

If at step 412 it is determined that a resistance or a reactance screen is not active, the program loops back to step 402 to await the next key press.

If at step 411 it is determined that the +/– key has not been pressed, then at step 414 it is determined whether the power flow setting mode key has been pressed. If so, then at step 415 the power flow setting mode screen is displayed and the program loops back to step 402 to wait for the next key press.

If at step 414 it is determined that the power flow setting mode key has not been pressed, then at step 416 it is determined whether the set point, VRC, VLC or Ops counter key has been pressed. If so, then at step 417 it is determined whether the screen is currently active. If so, the alternate or next screen is displayed at step 418 and the program loops back to step 402 to wait for the next key press.

If at step 417 it is determined that the screen is not currently active, then at step 419, the selected screen is shown, and the program loops back to step 402 to wait for the next key press.

If at step 416 it is determined that none of the setpoint, VRC, VLC and Ops counter keys has been pressed, then, in view of the string of negative previous determinations at steps 403, 404, 406, 407, 409, 411 and 414, an invalid key error routine is processed at step 420, and the program then loops back to step 402 to wait for the next key press.

The following glossary of symbols is particularly helpful in interpreting Table 4 which follows the glossary. Table 4, including its continuation, has eight menu headings of display screens: namely, <MENU:CONFIGURE>, <MENU:REGULATOR>, <MENU: METER>, <MENU:FW DEMAND>, <MENU:RV DEMAND>, <MENU:LOG SETUP>, <MENU:LOG/ALERT>, <MENU:COUNTER>. Under these headings, various screens that can be displayed by the alphanumeric LED display 19 are shown.

| GLOSSARY OF SYMBOLS | |
|---|---|
| A | Amps (if associated with Ild screen). |
| BW | Bandwidth. |
| Comp | (Line Drop) Compensation. |
| CT ratio | Current Transformer ratio. |
| DA | Day. |
| Dmd Subperiods | Demand (Interval) Sub-periods. |
| Dmd Time | Demand (Interval) Time. |
| F, FW or Fwd | Forward. |
| Freq | Frequency. |
| Hz | Hertz (measure of frequency). |
| I | I is a standard representation for electrical current, measured in Amperes. |
| Ild | Load Current. |
| KQ | Kilo-Vars (Vars = Volt-amp reactive). |
| KQHR | Kilo var hours. |
| KVA | Kilovoltamps measured at load. |
| KVARld | Kilovars measured at load. |
| KW | Kilo-Watts. |
| KWHR | Kilowatt hours. |
| KWld | Kilowatts measured at load. |
| Ld Pt | Load Potential Transformer (ratio) |
| M | Power Flow Direction; can be either "F" for forward, or "R" for reverse. |
| max | Maximum. |
| min | Minimum. |
| Mins | Minutes. |
| MO | Month. |
| NN . . . N | Numerical value that the regulator controller displays; it cannot be changed (or entered) by the user. The number of N's indicates the number of digits used to display the parameter. |
| Ops | operations. |
| PF | Power Factor. |
| PFKVA min | Power Factor at minimum KVA. |
| PFKVA max | Power Factor at maximum KVA. |
| Pol | Polarity |
| Pri | Primary (of Regulator's Step down transformer). |
| Pt Threshold | Potential Transformer Threshold. |
| Pwr Flow | Power Flow (mode). |
| (R) | Resistance (Line Drop Compensation). |
| R | Reverse. |
| Rev | Reverse |
| RV | Reverse. |
| Sec | Secondary (of Regulator's Step down transformer). |
| Src Pt | Source Potential Transformer (ratio) |
| Vcomp | Compensated Voltage. |
| VLC | Voltage Limit Control. |
| Vld | Load Voltage. |

-continued

GLOSSARY OF SYMBOLS

| | |
|---|---|
| VRC | Voltage Reduction Control. |
| VS | Source Voltage. |
| (X) | Reactance (Line Drop Compensation). |
| Xtrigger | External Trigger. |
| XX...X | Numeric value that can be user programmed. The number of X's indicates the number of digits used for this parameter. |
| YR | Year. |
| YYYY...Y | Numeric value that can be user programmed. The number of Y's indicates the number of digits used for this parameter. |
| ZZ...Z | Alphabetic field that cannot be changed (or entered) by the user. |

TABLE 4

DISPLAY SCREENS

| 1234567890123456 | 1234567890123456 | 1234567890123456 | 1234567890123456 |
|---|---|---|---|
| <MENU:CONFIGURE> | <MENU:REGULATOR> | <MENU:METER> | <MENU:FW DEMAND> |
| Type:  STRAIGHT | Fwd Volts: YYY.Y | VId = NNNNN M | F Dmd VId = NNNNN |
|      INVERTED | (YYY.Y = 106,134) | VId = NNNNN M max | max VId = NNNNN |
| | | VId = NNNNN M min | min VId = NNNNN |
| Syst:  WYE | Fwd BW: Y.Y V | | |
|      DELTA LAG | (YY.Y = 0.5,6.0,0.5) | Vs = NNNNN M | F Dmd IId = NNNNN |
|      DELTA LEAD | | Vs = NNNNN M max | max IId = NNNNN |
| | Fwd Delay: YYYS | Vs = NNNNN M min | min IId = NNNNN |
| Utility Pol:  NORM | (YYY = 0,180) | | |
|      REV | | Vcomp = NNNNN M | PFKVAmax = NNNZZZZ |
| | Fwd Comp(R): +/-YYV | Vcomp = NNNNN M | (ZZZZ = Lag, Lead) |
| Ld PT YYYYY:XXX | (YY = -24,24) | Vcomp = NNNNN Mmin | |
|   (YYYYY = 1500,15000) | | | PFKVAmin = NNNZZZZ |
|   (XXX = 100,150) | Fwd Comp(X): +/-YYV | IId = NNNN A M | (ZZZZ = Lag, Lead) |
| | (YY = -24, 24) | IId = NNNN A Mmax | |
| Src PT YYYYY:XXX | | IId = NNNNN A Mmin | F Dmd KW = NNNNN |
|   (YYYYY = 1500,15000) | Rev Volts: YYY.Y | | max KW = NNNNN |
|   (XXX = 100,150) | (YYY.Y = 106,134) | PF Lead = NNN | min KW = NNNNN |
| | | PF Lead = NNN max | |
| CTratio YYYY:X.X | Rev BW: YY.Y V | PF Lead = NNN min | F Dmd KQ = NNNNN |
|   (YYYY = 120,7200) | (YY.Y=0.5,6.0,0.5) | | max KQ = NNNNN |
| (X.X=0.1,9.5) | | PF Lag = NNN | min KQ = NNNNN |
| | Rev Delay; YYYS | PF Lag = NNN max | |
| Meter Volts:  PRI | (YYY =0,180) | PF Lag = NNN min | F Dmd KVA = NNNNN |
|      SEC | | | max KVA = NNNNN |
| | Rev Comp (R): +/-YYV | KVA = NNNNN M | min KVA = NNNNN |
| I Inhibit: YY% | (YY =24,24) | KVA = NNNNN Mmax | |
| (YY = 1,10) | | KVA = NNNNN Mmin | |
| | Rev Comp (X): +/-YYV | | |
| I Shift: YYY | (YY =-24,24) | KW = NNNNN M | |
| (YYYY = 000,359) | | KW = NNNNN Mmax | |
| | VCR Mode:  OFF | KW = NNNN Mmin | |
| Pwr Flow:  F LOCK |      LOCAL | | |
|      R LOCK |      REMOTE | KQ = NNNNN M | |
|      IDLE R | | KQ = NNNNN Mmax | |
|      BI-DIR | Local VRC%: YY.Y | KQ = NNNNN Mmin | |
|      NEUT R | (YY.Y=0,10) | | |
|      CO-GEN | | Freq = NN.NHz | |
| | VRC Stage1: YY.Y | Freq = NN.NHz max | |
| PT Threshold: YYY | VRC Stage2: YY.Y | Freq = NN.NHz min | |
| (YYY = 000,134) | VRC Stage3: YY.Y | | |
| | (YY.Y=0,10) | KWHR F = NNNNNNNNN | |
| TIME: YY:YY 2 | | KQHR F = NNNNNNNNN | |
| (YY:YY = 1:00, 12:59) | VRC Remote:  MJ-X | KWHR F = NNNNNNNNN | |
| (Z = A\|P) |      MJ3A | KQHR F = NNNNNNNNN | |
| Date: YY/YY/YY | MJ-3A VRC%: YY.Y | KWHR R = NNNNNNNNN | |
| (YY/YY/YY = | (YY.Y = 0,10) | | |
| 01/01/00, 12/31/99) | | | |
| DATE:  MO/DA/YR | VLC Enable: ON | | |
|      DA/MO/YR |      OFF | | |
| DmdTime: YYYMins | VLC upper: YYY.Y | | |
| (YYY = 1,999) | (YYY.Y = 120, 134) | | |
| DmdSubperiods: YY | VLC Lower: YYY.Y | | |
| (YY = 1,99) | (YYY.Y = 106,120) | | |
| <MENU:RV DEMAND> | <MENU:LOG SETUP> | <MENU:LOG/ALERT> | <MENU:COUNTERS> |
| R Dmd VId = NNNNN | Log Event:  ON | Alert: ZZZZZZZZZZ | Total Ops = NNNNN |
| max VId = NNNNN |      OFF | | |
| min VId = NNNNN | | "EventNN Values" | Elapsed Ops = NNNN |

TABLE 4-continued

DISPLAY SCREENS

| 1234567890123456 | 1234567890123456 | 1234567890123456 | 1234567890123456 |
|---|---|---|---|
|  | Event = Tap: ON | Event: NNNNNNN |  |
| R Dmd IId = NNNNN |  OFF | Date: NN/NN/NN | Reset NN/NN/NN |
| max IId = NNNNN |  | Teime: NN:NN:NN Z |  |
| min IId = NNNNN | Event = VLC: ON | Cause: ZZZZZZZZZ | Reset NN:NN Z |
|  |  OFF | VId = NNNN.N |  |
| PFKVAmax = NNNZZZZ |  | IId = NNNN.N | Day Ops = NNNNN |
| (ZZZZ = Lag, Lead) | Event = VRC: ON | PF = N.NN ZZZZ |  |
|  |  OFF | KWId = NNNNN | Month Ops = NNNNN |
| PFKVAmin = NNNZZZZ |  | KVARId = +/−NNNNN |  |
| (ZZZZ = Lag, Lead) | Log Interval: ON | KVAId = NNNNN | Years Ops = NNNNN |
|  |  OFF | Event: NNNNNNN |  |
| R Dmd KW = NNNNN |  | Date: NN/NN/NN | Tap = NNNNNNNN |
| max KW = NNNNN | Interval: YYHRYYM | Time: NN:NN:NN Z | (where NW...= |
| min KW = NNNNN |  | Cause: ZZZZZZZZZ | "Neutral" |
|  | Log Xtrigger: ON | VId = NNNN.N | "NN Raise", |
| R Dmd KQ = NNNNN |  OFF | IId = NNNN.N | "NN Lower" |
| Max KQ = NNNNN |  | PF = N.NN | or "????????") |
| min KQ = NNNNN |  | KWId = NNNNN |  |
|  |  | KVARId = NNNNN |  |
| R Dmd KVA = NNNNN |  | KVAId = NNNNN |  |
| max KVA = NNNNN |  |  |  |
| min KVA = NNNNN |  | "IntervalNN Val" |  |
|  |  | Date: NN/NN/NN |  |
|  |  | Time: NN:NN:NN Z |  |
|  |  | VId = NNNN.N |  |
|  |  | VId = NNNN.N max |  |
|  |  | VId = NNNN.N min |  |
|  |  | VId = NNNN.N dmd |  |
|  |  | IId = NNNN.N |  |
|  |  | IId = NNNN.N max |  |
|  |  | IId = NNNN.N min |  |
|  |  | IId = NNNN.N dmd |  |
|  |  | PF = N.NN |  |
|  |  | PF(KVAmax) = N.NN |  |
|  |  | PF(KVAmin) = N.NN |  |
|  |  | KWId = NNNNNN |  |
|  |  | KWId = NNNNN max |  |
|  |  | KWId = NNNNN min |  |
|  |  | KWId = NNNNN dmd |  |
|  |  | KVARId = NNNNN |  |
|  |  | KVARId = NNNNN max |  |
|  |  | KVARId = NNNNN min |  |
|  |  | KVARId = NNNNN dmd |  |
|  |  | KVAId = NNNNN |  |
|  |  | KVAId = NNNNN max |  |
|  |  | KVAId = NNNNN min |  |
|  |  | KVAId = NNNNN dmd |  |

Thus there is provided in accordance with the invention a novel and highly effective man-machine interface for a voltage regulator that enables a user of the apparatus easily and efficiently to display and control selected parameters of the voltage regulator. The invention accomplishes all of the objects set out above. Many modifications of the preferred embodiment of the invention disclosed herein will readily occur to those skilled in the art. For example, the type of computer and other hardware employed can easily be changed, and the specific functions performed by the discrete signal lamps can be modified in the discretion of manufacturers or users of the apparatus. Accordingly, the invention extends to all subject matter that falls within the scope of the appended claims.

We claim:

1. A method for displaying operational parameters of an electrical power distribution mains system step voltage regulator comprising:

selecting for display on an electronic display device a first operational parameter by actuating a dedicated input key assigned for displaying the first parameter; and selecting for display on the display device a portion of less than the whole of operational parameters set forth in a plurality of display menus by actuating menu navigation keys which cause the portion of operational parameters to be scrolled through the display.

2. A method for controlling an electrical power distribution mains system voltage regulator, the method comprising the steps of:

providing an input keypad for designating selected operating parameters of the electrical power distribution system voltage regulator, the input keypad being formed with dedicated function keys for display of specific voltage regulator operational information and menu navigation keys for selecting for display a portion of less than the whole of a plurality of menus of operational parameters and the parameters being divided into first and second categories, respectively;

providing a display for simultaneously displaying only a portion of less than the whole of all of the parameters; and at least one of:

activating the dedicated function keys to display parameters in the first category; and activating the menu navigation keys to select for display only a portion of less than the whole of the parameters in the first or second category.

3. Apparatus for controlling an electrical power distribution mains system step voltage regulator, said apparatus comprising:

an input device for designating for display selected operating parameters of the electrical power distribution mains system step voltage regulator, said input device having a dedicated function portion and a menu navigation portion, and said parameters being divided into first and second categories, respectively;

a display for simultaneously displaying only a portion of less than the whole of all of said first and second category parameters; and a computer connected to said input device and said display for controlling said display in response to activation of said input;

said apparatus being constructed so that any parameter in said first category can be displayed on said display by activation of said dedicated function portion and any parameter in said second category can be selected for display on said display by activation of said menu navigation portion.

4. Apparatus according to claim 3 wherein any parameter in said first category can be displayed on said display by activation of said menu navigation portion.

5. Apparatus according to claim 3 wherein said display comprises a display screen.

6. Apparatus according to claim 3 wherein said display comprises an LED display.

7. Apparatus according to claim 3 wherein said input device comprises a keypad.

8. Apparatus according to claim 3 wherein said input device comprises a keypad, said dedicated function portion comprises a plurality of keys physically grouped together in a first area of said keypad, and said menu navigation portion comprises a plurality of keys physically grouped together in a second area of said keypad.

* * * * *